(12) United States Patent
Digirolamo et al.

(10) Patent No.: US 11,340,698 B2
(45) Date of Patent: May 24, 2022

(54) SYSTEM AND METHODS FOR EVALUATING IMAGES AND OTHER SUBJECTS

(71) Applicant: UNIVERSITY OF MASSACHUSETTS, Boston, MA (US)

(72) Inventors: Gregory J. Digirolamo, Holden, MA (US); Max P. Rosen, Weston, MA (US)

(73) Assignee: University of Massachusetts, Boston, MA (US)

( * ) Notice: Subject to any disclaimer, the term of this patent is extended or adjusted under 35 U.S.C. 154(b) by 73 days.

(21) Appl. No.: 15/771,554

(22) PCT Filed: Oct. 31, 2016

(86) PCT No.: PCT/US2016/059684
§ 371 (c)(1),
(2) Date: Apr. 27, 2018

(87) PCT Pub. No.: WO2017/075572
PCT Pub. Date: May 4, 2017

(65) Prior Publication Data
US 2018/0314327 A1    Nov. 1, 2018

Related U.S. Application Data

(60) Provisional application No. 62/248,429, filed on Oct. 30, 2015.

(51) Int. Cl.
*G06F 3/01* (2006.01)
*G06K 9/32* (2006.01)
*G06V 10/25* (2022.01)
(52) U.S. Cl.
CPC .............. *G06F 3/013* (2013.01); *G06F 3/017* (2013.01); *G06V 10/25* (2022.01)

(58) Field of Classification Search
None
See application file for complete search history.

(56) References Cited

U.S. PATENT DOCUMENTS 5,204,703 A    4/1993   Hutchinson et al.
6,755,527 B1   6/2004   Goldberg
(Continued)

FOREIGN PATENT DOCUMENTS

WO    20110049558 A1    4/2011

OTHER PUBLICATIONS

Beard et al, "A Study of Radiologists Viewing Multiple Computed Tomography Examinations Using an Eyetracking Device", Journal of Digital Imaging, Nov. 1990.
(Continued)

*Primary Examiner* — Kent W Chang
*Assistant Examiner* — Benjamin Morales
(74) *Attorney, Agent, or Firm* — Hamilton, Brook, Smith & Reynolds, P.C.

(57) ABSTRACT

Eye movements and/or physiological characteristics of a user viewing a subject are detected and quantified to produce data to determine one or more details that is or was observable in the scene or image of which the user may or may not be consciously aware. Eye movement data includes the number of times a user looks at each area of a subject ("fixation number"), the length or duration of the fixation ("fixation duration value"), the number of times a user returns to look at a particular area ("fixation repeats"), and additionally any changes to pupil size based on dilation/constriction ("pupil size"). Physiological characteristic data includes heart rate, pulse or skin conductance. Advantageously, the system and methods may be used for a variety of purposes including evaluation improvement and training.

24 Claims, 7 Drawing Sheets

(56) References Cited

U.S. PATENT DOCUMENTS

| | | | |
|---|---|---|---|
| 7,501,995 | B2 | 3/2009 | Morita et al. |
| 7,573,439 | B2 | 8/2009 | Lau et al. |
| 7,576,757 | B2 | 8/2009 | Kariathungal et al. |
| 7,738,684 | B2 | 6/2010 | Kariathungal et al. |
| 7,953,944 | B2 | 5/2011 | Raczynski |
| 8,184,069 | B1 | 5/2012 | Rhodes |
| 8,184,854 | B2 | 5/2012 | Bartsch |
| 8,295,909 | B2 | 10/2012 | Goldbach |
| 8,467,133 | B2 | 6/2013 | Miller |
| 8,471,783 | B2 | 6/2013 | Rhodes |
| 8,472,120 | B2 | 6/2013 | Border et al. |
| 8,477,425 | B2 | 7/2013 | Border et al. |
| 8,482,859 | B2 | 7/2013 | Border et al. |
| 8,488,246 | B2 | 7/2013 | Border et al. |
| 8,814,691 | B2 | 8/2014 | Haddick et al. |
| 8,855,719 | B2 | 10/2014 | Jacobsen et al. |
| 8,885,882 | B1 | 11/2014 | Yin et al. |
| 8,929,954 | B2 | 1/2015 | Jacobsen et al. |
| 2002/0105482 | A1* | 8/2002 | Lemelson ............... G06F 3/013 345/7 |
| 2005/0175218 | A1* | 8/2005 | Vertegaal ............... A61B 3/113 382/103 |
| 2005/0251741 | A1 | 11/2005 | Pilu et al. |
| 2006/0110008 | A1* | 5/2006 | Vertegaal ........... G06K 9/00604 382/103 |
| 2007/0104369 | A1 | 5/2007 | Weatherhead |
| 2010/0039617 | A1* | 2/2010 | Martinez-Conde .... A61B 3/113 351/209 |
| 2010/0295774 | A1 | 11/2010 | Hennessey |
| 2011/0270123 | A1 | 11/2011 | Reiner |
| 2014/0312124 | A1* | 10/2014 | Walker ................. B65F 1/1484 235/492 |
| 2014/0313124 | A1* | 10/2014 | Kim ..................... G06F 1/3231 345/156 |
| 2018/0239955 | A1* | 8/2018 | Rodriguez ........... G06K 9/0061 |

OTHER PUBLICATIONS

Cooper, L. et al, "The assessment of stroke multidimensional CT and MR imaging using eye movement analysis: does modality preference enhance observer performance?", Society of Photo-Optical Instrumentation Engineers, Feb. 23, 2010.

Drew, T. et al, "Scanners and drillers: Characterizing expert visual search through volumetric images.", Journal of Vision, Aug. 6, 2013.

Ellis et al, "Thin-section CT of the lungs: eye-tracking analysis of the visual approach to reading tiled and stacked display formats.", European Journal of Radiology, vol. 59, May 17, 2006.

Evans, K. et al, "If You Don't Find It Often, You Often Don't Find It: Why Some Cancers Are Missed in Breast Cancer Screening", PLoS One 8(5), May 30, 2013.

Kundel et al, "Using gaze-tracking data and mixture distribution analysis to support a holistic model for the detection of cancers on mammograms.", Academic Radiology, vol. 15, Issue 7, Jul. 2008.

Manning et al, "How do radiologists do it? The influence of experience and training on searching for chest nodules.", Radiography, vol. 12, No. 2, May 2006.

Markonis et al, "A survey on visual information search behavior and requirements of radiologists", Methods of Information in Medicine, 51(6), Aug. 2012.

Nodine et al, "How Experience and Training Influence Mammography Expertise", Academic Radiology, 6(10), Oct. 1999.

Peterson, C, "Factors associated with success or failure in radiological interpretation: Diagnostic-thinking approaches.", Medical Education 33(4).

Phillips, P. et al, "Method for tracking eye gaze during interpretation of endoluminal 3D CT colonography: technical description and proposed metrics for analysis.", Radiology, 267 (3), Jun. 1, 2013.

Pinto et al., "Spectrum of diagnostic errors in radiology", World Journal of Radiology, 2(10), Oct. 28, 2018.

Chris Lankford ED-Spencer S N (ED): "Gazetracker", Proceedings Eye Tracking Research & Applications Symposium 2000. (ETRA). Palm Beach Gardens, FL, Nov. 6-8, 2000, New York, NY : ACM, US, Nov. 8, 2000 (Nov. 8, 2000), pp. 51-55, XP05826807 4, DOI: 10.1145/355017.355025 ISBN: 978-1-58113-280-9.

European Extended Search Report, dated May 15, 2019.

Newell et al.; "Unconscious influences on decision making: A critical review"; Behavioral and Brain Sciences—Jan. 2014 (62 pages).

Bode et al.; "Tracking the Unconscious Generation of Free Decisions Using Ultra-High Field fMRI"; PLoS One 6(6): e21612. doi:10.1371/journal.pone.0021612; Jun. 27, 2011 (13 pages).

Branan; "Unconscious Decisions"; Scientific American; Aug. 1, 2008; www.scientificamerican.com/article/unconscious-decisions (6 pages).

* cited by examiner

SYSTEM AND METHODS FOR EVALUATING IMAGES AND OTHER SUBJECTS

CROSS-REFERENCE TO RELATED APPLICATIONS

This application claims priority to U.S. Provisional Patent Application 62/248,429 filed Oct. 30, 2015, incorporated by reference.

FIELD OF THE INVENTION

The invention is directed to a system and methods by which the movement of the eyes of a user and/or physiological characteristics including, for example, changes in a point of gaze, pupil diameter, heart rate, pulse or skin conductance viewing a subject can be detected and quantified to produce data from which content may be developed that may be displayed in order to provide information regarding the subject including that of which the user may not have been consciously aware. Certain preferred embodiments of the invention include an eye tracker apparatus by which the movement and size of the eyes of the user viewing a subject may be monitored and eye movement data generated and a display device by which an eye movement information product may be formed from at least the content developed from the eye movement data for display relative to the subject. Certain specific preferred embodiments of the invention include a grid development program by which the eye movement data may be organized relative to the subject to generate the content to form the eye movement information product for display through the use of the display device.

BACKGROUND OF THE INVENTION

As part of their jobs, a variety of professionals are required to view various subjects and detect details, make estimates, and generate conclusions often in a short amount of time in order, for example, to possibly take some action. Often these individuals have received specific training inherent to their profession in the identification of task relevant information. For example, a pilot is required to view through the windows of the plane's cockpit a scene—such as the surrounding sky or land below—in order to determine the present conditions and estimate whether or not some unexpected event may take place—such as whether some other plane is flying on a course that may be potentially dangerous for the course the pilot is taking. A soldier or sailor standing guard is similarly required to view a scene and determine the present conditions and estimate whether there is some risk to that which the soldier or sailor is guarding. A restorer of fine art may be required to view, for example, a two-dimensional subject, such as an oil painting, fresco, tapestry, or other work of art, and determine the condition of the work and whether and what portions of the work must be restored. A health care worker—such as a radiologist—is required to view a two-dimensional subject such as a such as one or more radiological images including, for example, X-ray images, computerized tomography (CT) scans, Magnetic Resonance Imaging (MRI) scans and determine the condition of the patient and whether any abnormality is observable in the images or scans and the risk it may present to the patient.

Despite the importance, individuals may from time to time fail to accurately view and determine the fine details of a subject, and estimate the risk based on that information. For example, radiologists may at times believe that they have not detected any abnormalities in the images or scans that the radiologists have reviewed when, in fact, the evidence of one or more abnormality is actually visible in the two-dimensional subjects. These cognitive visual perceptive errors are said to be caused by certain types of specific errors. One type of such perceptive error is termed a decision error and is caused by a radiologist visually fixating on an abnormality but opining that it is normal. Another type of perceptive error is termed a recognition error and is caused by a radiologist visually fixating on an abnormality but not identifying it. A third type of perceptive error is termed a scanning error and is caused by a radiologist not visually fixating on a region that contains an abnormality.

It has been found that, while the individual may believe that he or she has not seen a detail which the individual was seeking (such as a flaw in a work of art, defect in a machined part, or an abnormality in a tissue sample), the individual may actually have unconsciously detected it.

A demand therefore exists by which information—reflecting the unconscious estimation by an individual that evidence of a sought-after detail does exist in a scene, image, or other subject—may be provided to an individual, either to support the individual's opinion that the detail was observed or to encourage the individual to reconsider the initial estimation that the detail was not observed. The invention satisfies the demand.

SUMMARY OF THE INVENTION

The invention is directed to a system and methods by which the movement of the eyes of a user and/or pupil size viewing a subject such as a scene or one or more images can be detected and quantified to produce eye movement data and, from the data, develop content that may be displayed relative to the subject in order to form an information product to provide information regarding a detail or details that is or was observable in the subject of which the user may not be consciously aware. In addition, the invention may include detecting and quantifying "physiological characteristics" to produce "physiological characteristic data" that includes, but is not limited to, heart rate, pulse or skin conductance.

The invention is based on the principle that the degree to which the eyes of a user fixate, return, or dwell, or changes occur in physiology indicating arousal, on a detail or portion of a subject is proportional to the importance of the detail or portion of the subject to the user's analysis.

The invention may use physiological characteristic data along with eye movement data to determine both correct and incorrect conscious detection as well as unconscious detection of one or more areas of interest in an image, for example an abnormality in a radiological image, and communicate feedback to the user to improve outcomes. Feedback includes communicating the areas identified within the image or scene that the eyes are unconsciously revisiting, spending longer fixating, or create changes in physiology as indexed by measurables (increases or decrease pupil diameter, changes in heart rate, pulse or skin conductance). For purposes of this application, "area of interest" may be any location on the subject or point of the scene or image that is sought after depending on the application to which the invention is applied, for example, an abnormality such as a tumor found in radiological applications.

Among other applications, embodiments of the invention may be used for the training, evaluation, and application for guards, soldiers, and administrative agents. For example, embodiments of the invention may be used by agents of the transportation agencies such as the U.S. Transportation Security Administration for the screening of bags being checked as well as bags being brought on-board. In such an application, the information products may inform the agents which bags were checked or not checked, what portion of the interior of the bags was checked or not checked, and whether the agent observed a person or person passing a check-point and to what extent. Similarly, the invention may be used by customs and border protection personnel such as the U.S. Customs and Border Protection Agency. The sought-after detail—area of interest—will vary from application to application.

Using the invention in a training mode may permit a user—such as an instructor or accrediting agency—to draw, for example, from an archive of images and show those images to a user—such as a student—in order to evaluate the student's ability to analyze the images. By collecting data of the movement of the student's eyes while viewing the images, the instructor may learn how the student is viewing the images and whether any correction is needed. For example, the student may be shown the information product generated from the use of the system to learn how the student viewed the images. The training mode may permit a user to view a subject, not drawn from archives, analyze it, and provide an evaluation.

A non-training mode may permit a user—such as a radiologist—to view an image for abnormalities. The non-training mode provides the user with feedback regarding the subject including that of which the user may not have been consciously aware. For example, the feedback may include locations on the image where an abnormality may exist, but that the user did not consciously identify. The invention may also be used to learn or apply more sophisticated viewing strategies.

Alternatively, deep machine learning systems or artificial intelligence systems can be used to assist the user in finding an area of interest in which an abnormality may be present. For example, the invention may use eye movement data and/or physiological characteristic data of a particular radiologist to learn patterns of that radiologist indicating how that radiologist views images and how the eye movements and physiological characteristics change when abnormality is detected, either consciously or unconsciously. According to this embodiment, the invention learns patterns of data of individual radiologists or patterns for groups of radiologists. Training systems on eye movement data and/or physiological characteristic data of individual radiologists improves upon current practice that trains a system on the images, e.g., to indicate usual locations of abnormalities found in prior brain images. In other words, instead of the conventional systems trained on prior images and the locations for abnormalities in those images, the invention may be trained on current and prior eye movement data and/or physiological characteristic data and the abnormalities that particular user correctly locates, incorrectly locates or misses altogether.

As an example, the trained system could be used for generalizing eye movement patterns for a new radiologist in the system to classify their eye movements and determine if their pattern of eye movements in a particular location are a match for what has been seen in past eye movement patterns in other radiologists. In other words, once the deep machine learning has occurred across a group of radiologists, it may be used to determine if the current eye movement pattern of a radiologist (even if the system hasn't learned his/her eye pattern yet) is like that of other radiologists when they've unconsciously detected an abnormality.

Although the invention is discussed with respect to eye movements including movements directed to an increase or decrease in pupil diameter, any physiological characteristics are contemplated.

Certain specific embodiments of the invention include an eye tracker apparatus used to track and monitor the movement of the eyes' point of gaze and changes in pupil size to generate "eye movement data". A display device may be used to display at least the content generated from the eye movement data, and further may preferably display the data in juxtaposition relative to the subject to form an information product. Certain embodiments of the display device include one or more processing components to facilitate the integration of and development of the content from the eye movement data and form the information product.

Certain embodiments of the invention include a grid development program by which information based on the content drawn from the eye movement data may be organized to generate the content to form the information product for display through the use of the display device.

For purposes of this application, a "scene" may be an actual three-dimensional space, including a room interior, building exterior, landscape, or skyscape that may be observed by a user. A scene may be also that which has the appearance of a three-dimensional space or object and that may be created through an arrangement of related two-dimensional images, virtual reality systems or other digital systems. A scene may be observable using an observation surface. Such a "surface" may, for example, be a window or a lens on or through which information may be "thrown", "created", or displayed. For purposes of this application, an "image" is a two-dimensional view that a user may examine. Examples of such a two-dimensional view can be some form of tangible medium including an analog photo, scan, print, or painting. Other examples of such a two-dimensional view can be that which may be mechanically, electronically, or digitally "thrown", created, or shown on a display such as a screen or monitor. A series of images for which eye movement information products are formed may be related such that what appears to have a third dimension is developed and one or more additional information products may be formed.

Certain embodiments of the processor component include a grid development program by which the eye movement data may be organized to generate the content to form the information product for display using the display device. The grid development program provides a grid coordinate map that may be either two-dimensional or three-dimensional depending, in part, whether the subject was a scene or an image. More particularly, the grid development program overlays a coordinate map on the subject used in the collection of the eye movement data.

The information product that may be formed using certain embodiments of the invention may provide a user with certain or more information regarding the movements that the eye made while viewing a subject or any physiological changes the user made. The information product that may be formed through the use of embodiments of the invention may support or enhance the user's estimation or conclusion or cause the user to reevaluate the subject and possibly produce a different estimation or draw a different conclusion.

Certain embodiments of the invention may be configurable such that the information product may provide the user with certain or a wide range of eye movement metrics based on the eye movement data. Depending on the eye tracker apparatus and the computer system available for analysis, the eye movement data includes some or all of the following: the location on the map of the subject on which the user's eyes fixated ("coordinate"), a number of times a user looks a particular area ("fixation number"), the length or duration of the fixation ("fixation duration value"), the number of times a user returns to look at a particular area ("fixation repeat number") and additionally any changes to pupil size based on dilation/constriction ("pupil size"). In addition, other eye movement data may include the duration of time the eyes spent during each revisit, the speed of the onset of the eye movement to a location; and the speed of the eye movement. In addition to pupil size, any physiological measures of relative arousal are contemplated such as heart rate, galvanic skin response or skin conductance, and pulse measured while a user is viewing particular areas of an image or scene of a subject.

Generally contemporaneous feedback may be provided to a user showing the subject that was viewed by the user with the content generated from the eye movement data displayed relative to the subject. Feedback may be provided by metrics to the user numerically, through words, and/or through some other symbol. The information product may provide generally contemporaneous feedback or historic feedback to the user viewing the subject, or another user or users, or to those supervising or teaching the user or users. The feedback may prompt a user to re-view the subject again and, for example, determine whether the conclusions that were initially drawn are accurate.

For example, these metrics may be in the form of alpha-numeric characters. The information product may provide the eye movement metrics as or with symbols—such as one or more colors—whose intensity, hue, pattern, or opacity may change relative to the eye data—one or more geometric shapes—whose size and possibly color may change relative to the eye data—and/or one or more recognized graphemes. For purposes of this application, such alpha-numeric characters, geometric shapes, and graphemes are generically termed also "symbols". The information product may provide instead of or in addition to the symbols one or more sounds, words, or change in lighting as "data alerts" to the user by which a user may be informed that the data, content, and/or information product that has been obtained, developed, or formed has equaled or exceeded a threshold or standard, such as one set by the user.

As another example, if the system is configurable to provide simultaneous analyses and generally contemporaneous feedback while a user is viewing a subject, a radiologist who is viewing a patient image or images may, by moving to the next image in a series of images, be informed through a data alert (e.g., a sound or a visual flash) that the image that was just viewed will be re-presented as an information product. The information product may show one or more areas (or coordinates) of the originally viewed image in highlighting (such as a red colored box) to inform the radiologist in which area the eye movement data was different than the other areas. Such use of color as a symbol may be complemented with alpha-numeric characters or one or more other symbols. Likewise, the information product may inform the radiologist—such as through a yellow colored box—which area or areas (coordinate or coordinates) of the previous image the user did not view at all or less than other areas of the image, which area or areas of the image the user spent the least amount of times examining, or the area or areas of the image in which the user returned the least amount of time.

The system may be configurable to provide information products such as those described above to the radiologist as the radiologist progresses through all the related images. At the completion of the review of the images, the radiologist or another or others can be provided with an information product that summarizes the analysis conducted by the radiologist. In certain embodiments of the invention, such a summary information product may be a collection of images (such as successive "slices" of a tissue sample) in which the radiologist may be informed, for example, what feature or features appears in multiple images, which may be spatially related, and whether and in which of the images the feature or features was viewed by and detected by the radiologist. The summary information product may provide the radiologist also with comprehensive averages across all the radiological images that were viewed and a final date alert showing which area or areas in multiple images in which the data diverged from the average data in either less viewing of more viewing as compared to other radiologists. A data alert may be given after the radiologist finishes the reading and reviewing the summation that, for example, that suggests to the radiologist to re-view one or more images to ensure that an accurate reading was accomplished and nothing was missed.

Certain embodiments of the invention include memory components in which the subject, the data, the content, and the information product generated from the viewing of the subject can be retained. This material may be made accessible to another or others such as through one or more networks such as for supervision or teaching purposes or to allow another health care worker to incorporate some of all in a report or record (e.g., a medical report or an electronic health record) or to accrediting agency to evaluate performance and/or competence. Accordingly, certain embodiments permit some or all the data, content, and information product to be reviewed by supervisors to ensure that the areas showing minimal or maximal eye information does not contain a feature or features that were the subject of the analysis but were "missed". For training, students may find through the use of embodiments of the system in what contexts they are missing a sought detail or feature. Likewise, teachers can view the information product and determine on what subject and what features the student is spending less or more time. This specific and detailed information about where, for how long, and through the use of which technique the students are viewing a subject will help a teacher to develop a more sophisticated understanding of how the student may be learning and doing the viewing.

Additional embodiments of the invention permit the eye movement data, the content, and the information products that are formed to be assembled as a collection. This collection, when, for example, viewed as a movie, may be used as a direct evaluation tool to ensure that users are accurately and appropriately viewing to subjects. Such a collection may demonstrate how a user is viewing a subject and whether the pattern needs to be corrected to adjust the accuracy rate. Additionally, such a collection may be used to ensure that viewing of all images was performed by a properly trained professional.

The invention may be integrated with any healthcare environment, such as hospitals or clinics, and provided as part of information systems, such as hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR), to name a few.

The invention and its attributes and advantages may be further understood and appreciated with reference to the detailed description below of one contemplated embodiment, taken in conjunction with the accompanying drawings.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

The invention is directed to a system and methods by which the movement of the eyes of a user viewing a subject can be detected and quantified to produce data and, from the data, draw content that may be displayed relative to the subject in order to form an information product by which information such as eye movement metrics. Certain embodiments of the invention may be configurable such that the information product may provide the user with certain or a wide range of eye movement metrics and/or physiological metrics based on the eye movement data and/or physiological characteristic data. Eye movement data includes that directed to changes in a point of gaze and may also include changes in pupil diameter. More specifically, eye movement data is directed to the number of times a user looks at each particular area of a subject ("fixation number"), the length or duration of the fixation ("fixation duration value"), the number of times a user returns to look at a particular area ("fixation repeat number"), and additionally any changes to pupil size based on dilation/constriction ("pupil size").

Although the following describes the invention according to a radiologist reviewing an anatomical subject such as a MRI scan, the invention is applicable to any user reviewing any type of visual information.

Figure 1:
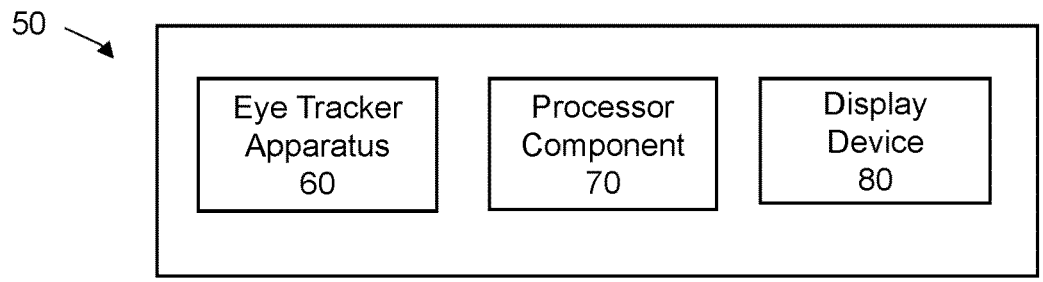
FIG. 1 illustrates a system block diagram according to the invention.

As shown in FIG. 1, a system 50 according to the invention includes at least an eye tracker apparatus 60, a processor component 70, and a display device 80. The eye tracker apparatus 60 measures a point of gaze (where one is looking). The eye tracker apparatus 60 collects data of the movement of a user's eyes when viewing the subject. The eye tracker apparatus 60 may include an eyewear headset—such as a wearable head-mounted eye tracker apparatus.

A processor component 70 executes the instructions of the invention for collecting and analyzing eye movement data and/or physiological characteristic data. The tracking processor component 70 may be a component of and/or separate from the eye tracker apparatus 60 and may detect, for example, at what detail or feature of the subject the user is viewing, for how long, and the path of the movement of the user's eyes and generate data that may be further processed to generate content and information product. More specific embodiments of the invention may include an eye tracker apparatus 60 (e.g., the "Eye-Link 1000") by which the movement of the eyes of a user may be monitored remotely, who is observing a scene or one or more images, may be monitored and certain data regarding the movement collected and stored for analysis by the system 50.

The system 50 processes the eye movement data and/or physiological characteristic data to develop content and information product, or feedback. The system 50 may provide one or more default arrangements for displaying the feedback on the display device 80 depending on the mode that was selected, the subject that was viewed, and the data that was generated. The system 50 may also permit the user to configure the system 50 to generate customized feedback.

A display device 80 illustrates the feedback in visual, audible, or tactile form, and may include for example, a monitor or touch screen. It is also contemplated that the display device 80 may be integrated with the eye tracker apparatus 60, for example Google Glass or Oculus. The information product may be in the form of a summary of the analysis of all such related subjects. Such an information product may be useful to a health care worker who through the analysis and combination of related tissue slices may better understand the size and/or complexity of an abnormality.

Certain embodiments of the system 50 permit the information product to be presented generally contemporaneously with the viewing of the subject by the user thereby permitting same individual who made the initial observations may have the opportunity to make a subsequent observation of the same subject.

Figure 2:
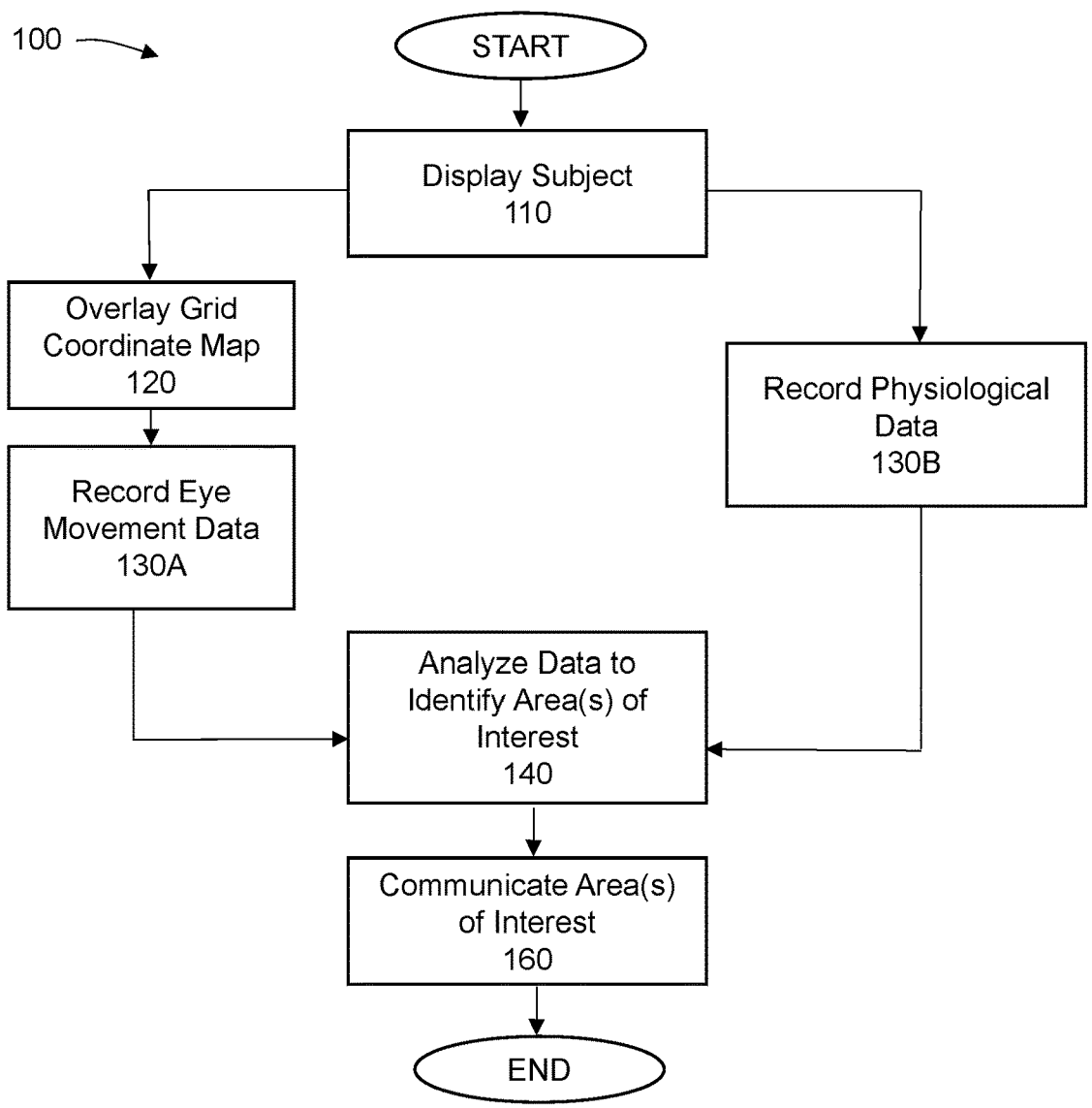
FIG. 2 illustrates a flow chart of the steps for evaluating a subject according to the invention.

Subjects are evaluated according to the flowchart 100 shown in FIG. 2. A user is provided or obtains access to the subject. Such access may be the opportunity a user gains to view a scene, such as an actual three-dimensional space, including a room interior, building exterior, landscape, or skyscape. The room interior may be inside an airport and the space, individuals, and equipment that an agent is required to inspect to assess risk. An exterior space may be that which a guard is required to patrol or in which a pilot or sailor is required to navigate a craft. Access to the subject alternatively may require that the appearance of a three-dimensional space or object be created. Such an appearance may be developed by arranging related two-dimensional images or through virtual reality or other digital systems. The subject may also be one or more images, such as the two-dimensional content shown in a tangible medium including an analog photo, scan, print, or painting or that which may be mechanically, electronically, or digitally "thrown", created, or shown on a display such as a screen or monitor. One application of certain embodiment of the invention may be directed to all radiological images generated through the user of various imaging methodologies (MRI, PET, CT, X-Ray, etc.) that are viewed by various health care professionals, including radiologists, other doctors, and nurses. At step 110 a subject is displayed in the form of an image or a scene.

Figure 3:
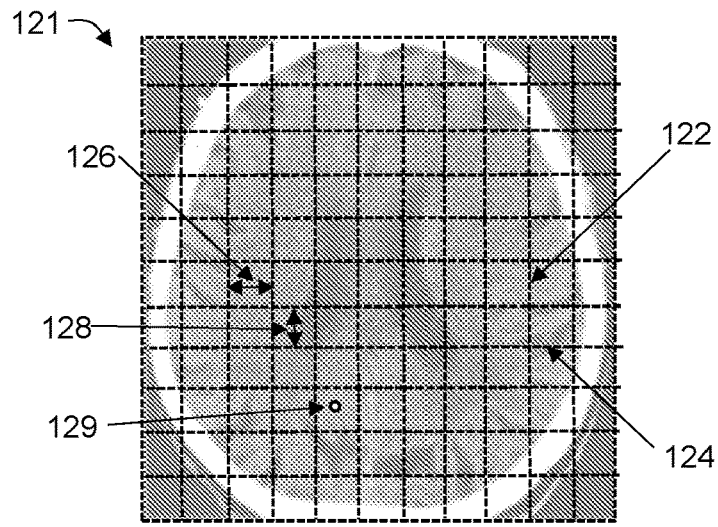
FIG. 3 illustrates a coordinate map of a grid development program according to the invention.

As shown at step 120 of FIG. 2, a grid development program overlays a coordinate map on the subject depending on whether the subject is a two-dimensional image or three-dimensional scene. FIG. 3 illustrates a grid coordinate map 121 comprising a crisscrossed or mesh pattern of parallel vertical bars and parallel horizontal bars 122, 124 defining a plurality of coordinates—x,y or x,y,z—such as that shown at element 129. The grid coordinate map may be either invisible or visible to the user. The spacing 126 between two parallel vertical bars 122 and the spacing 128 between two parallel horizontal bars 124 is determined based on the scene or image, for example, the level of illustration detail of the subject, the range of colors, etc. Although the coordinate map is illustrated as a pattern of parallel vertical and parallel horizontal bars, any arraignment or configuration is contemplated such as concentric circles spaced randomly apart.

At step 130A of FIG. 2, eye movement data is recorded with a point of gaze of a user corresponding to a coordinate on the grid map. Eye movement data is directed to the number of times a user looks each particular area ("fixation number"), the length or duration of the fixation ("fixation duration value"), and the number of times a user returns to look at a particular area ("fixation repeat number"). Additionally, eye movement data includes any changes to pupil size based on dilation/constriction ("pupil size"). Alternatively, physiological data may be recorded at step 130B such as any changes in physiology as measured by the eye-tracker or any external measure being feed into the system, including for example, heart rate, galvanic skin response or skin conductance, and pulse measured while a user is viewing particular areas of an image or scene of a subject.

At step 140, the eye movement data and/or physiological characteristic data is analyzed to determine correct and incorrect conscious detection as well as unconscious detection of one or more areas of interest in an image.

FIG. 4 through FIG. 7 are directed to flow charts further detailing the analysis of each of the eye movement data—a fixation number, fixation duration value, fixation repeats, pupil size—to identify an area of interest. It is contemplated that each of fixation number, fixation duration value, fixation repeats, and pupil size may be used to identify an area of interest as well as any combination of the eye movement data, for example, fixation number and duration or fixation number, duration, and repeats to identify areas of interest.

Figure 4:
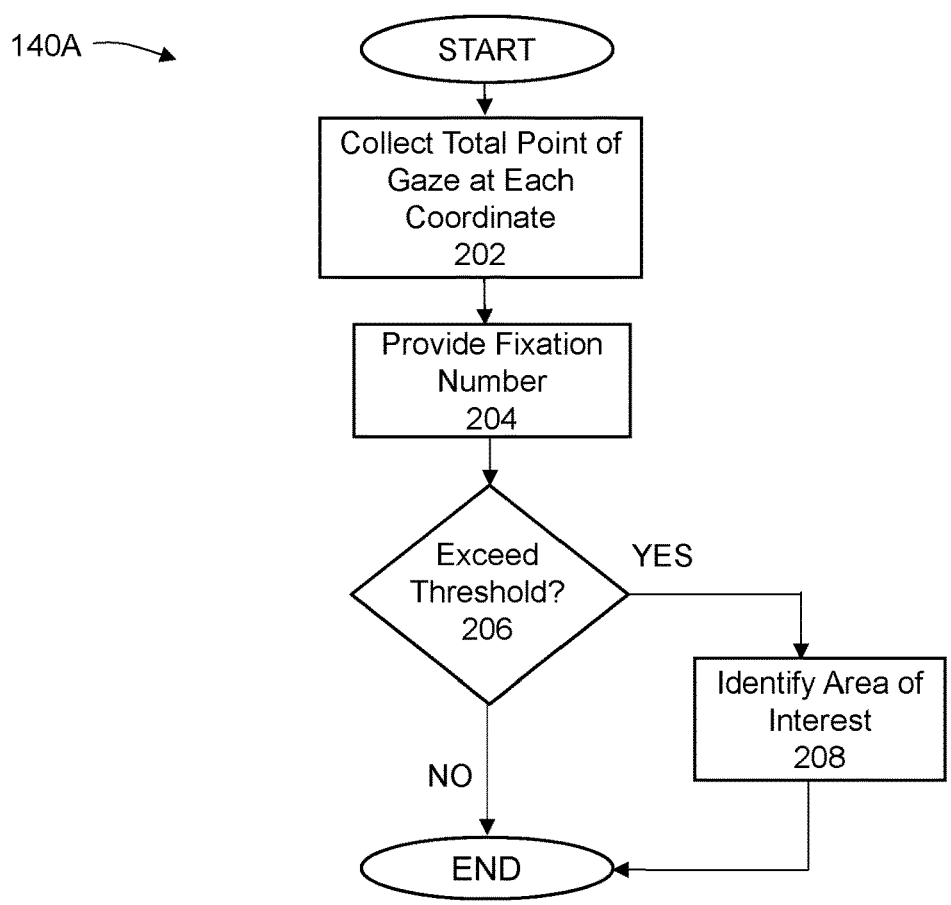
FIG. 4 illustrates a flow chart of the steps for analyzing eye movement data directed to fixation number according to the invention.

FIG. 4 illustrates a flow chart 140A of the steps for analyzing eye movement data directed to fixation number according to the invention. At step 202 the point of gaze recorded at each coordinate on the grid map are collected. The total number of gazes as each coordinate is provided as a fixation number at step 204. If the fixation number exceeds a pre-determined threshold value at step 206, an area of interest is identified at step 208. According to certain embodiments, the pre-determined threshold value may be based on the total number of points of gaze recorded. For example, if 100 points are collected, the threshold value may be 10 such that the coordinates on the map viewed 10% or more indicate an area of interest on the subject. It is contemplated that the pre-determined threshold value may be calculated from the user's data collected during previous viewing sessions or from data of multiple users. More specifically, the threshold value is dynamic and may be calculated based on the user's own viewing patterns such as a number of fixations related to a particular subject or based on a number of fixations from previous viewings of similar subjects, or based on deep machine learning (FIG. 8) of how many fixations are typically recorded for the current image being viewed or previous similar images.

Figure 5:
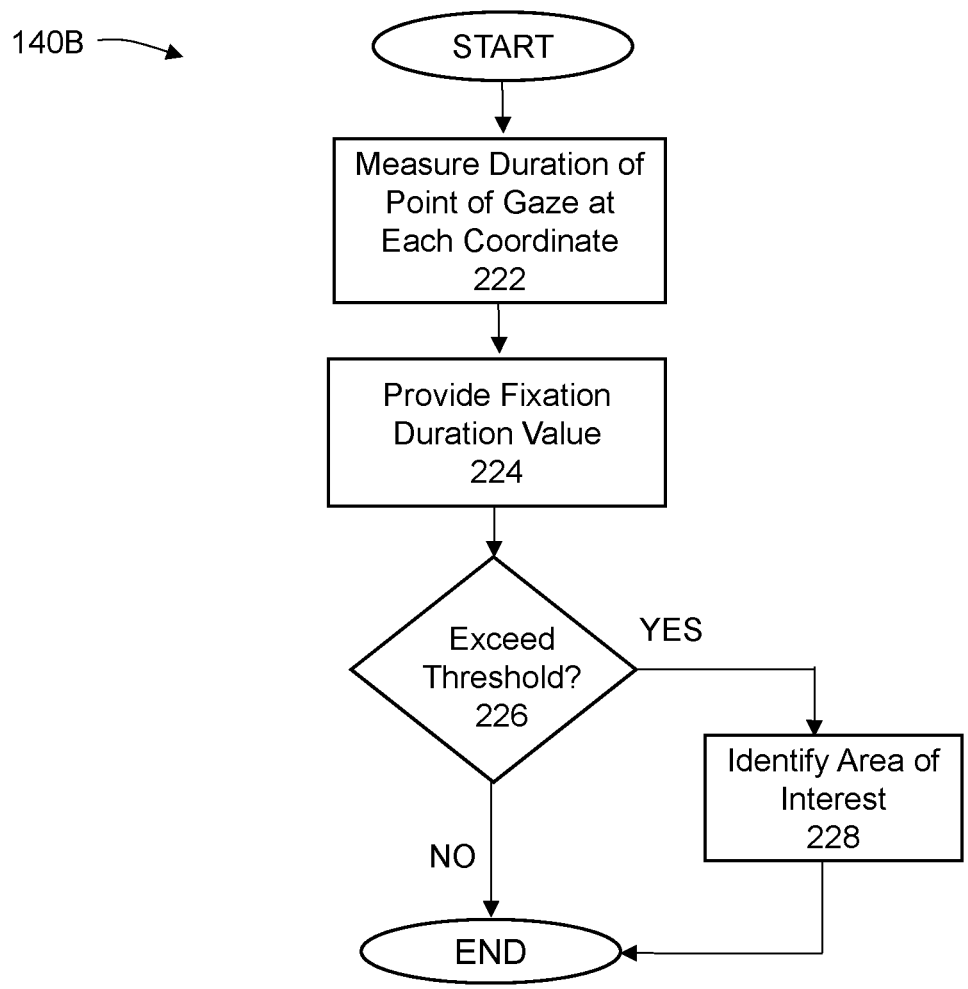
FIG. 5 illustrates a flow chart of the steps for analyzing eye movement data directed to fixation duration value according to the invention.

FIG. 5 illustrates a flow chart 140B of the steps for analyzing eye movement data directed to fixation duration value according to the invention. At step 222 the time each point of gaze spent at a coordinate on the grid map is measured, and may further be summed for a total time the user spent looking at a particular area (i.e., coordinate). The duration of each point of gaze is provided as a fixation duration value at step 224. If the fixation duration value exceeds a pre-determined threshold value at step 226, an area of interest is identified at step 228. The pre-determined threshold value may be, for example, 5 milliseconds; however, any measure of time is contemplated such as seconds, minutes, etc. It is contemplated that the pre-determined threshold value may be calculated from the user's data collected during previous viewing sessions or from data of multiple users. More specifically, the threshold value is dynamic and may be calculated based on the user's own viewing patterns, or based on deep machine learning (FIG. 8) of the durations typically recorded for the current image being viewed or previous similar images.

Figure 6:
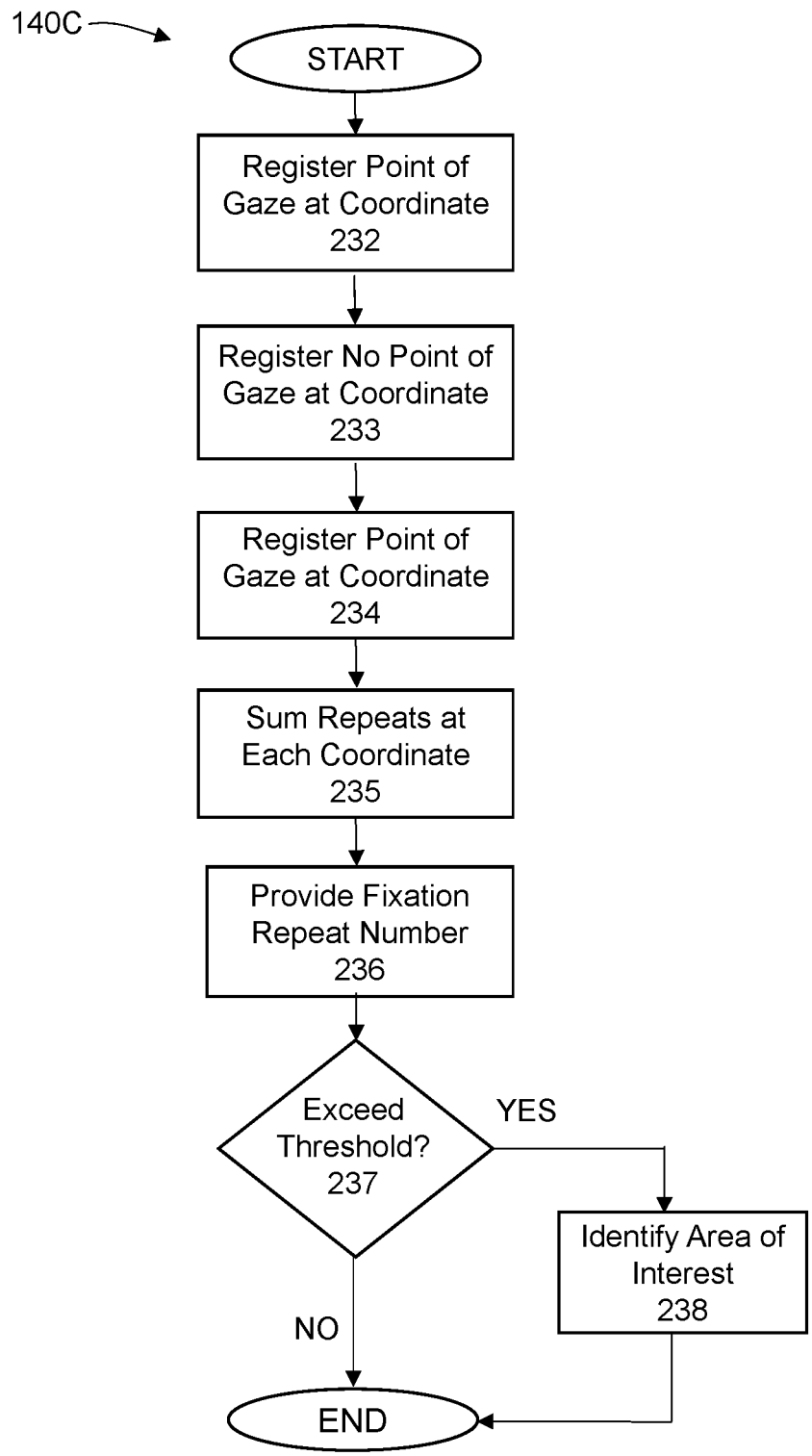
FIG. 6 illustrates a flow chart of the steps for analyzing eye movement data directed to fixation repeats according to the invention.

FIG. 6 illustrates a flow chart 140C of the steps for analyzing eye movement data directed to fixation repeats according to the invention. At step 232, the point of gaze at a coordinate is registered. If the user looks away from that coordinate, the absence of the gaze is registered at step 233. Following at step 234, a fixation repeat is counted if the point of gaze is registered again at that coordinate. At step 235, all fixation repeats counted are summed at each coordinate on the grid map to provide a fixation repeat number at 236. If this number exceeds a threshold at step 237, an area of interest is identified at step 238. According to certain embodiments, the pre-determined threshold value may be 5 or more such that if the user returns to the same coordinate on the coordinate map 5 or more times, an area of interest is identified. It is contemplated that the pre-determined threshold value may be calculated from the user's data collected during previous viewing sessions or from data of multiple users. More specifically, the threshold value is dynamic and may be calculated based on the user's own viewing patterns such as a number of fixation repeats occurring in a particular image or based on a number of fixation repeats from previous viewings of similar images, or based on deep machine learning (FIG. 8) of how many repeats are typically recorded for the current image being viewed or previous similar images.

Figure 7:
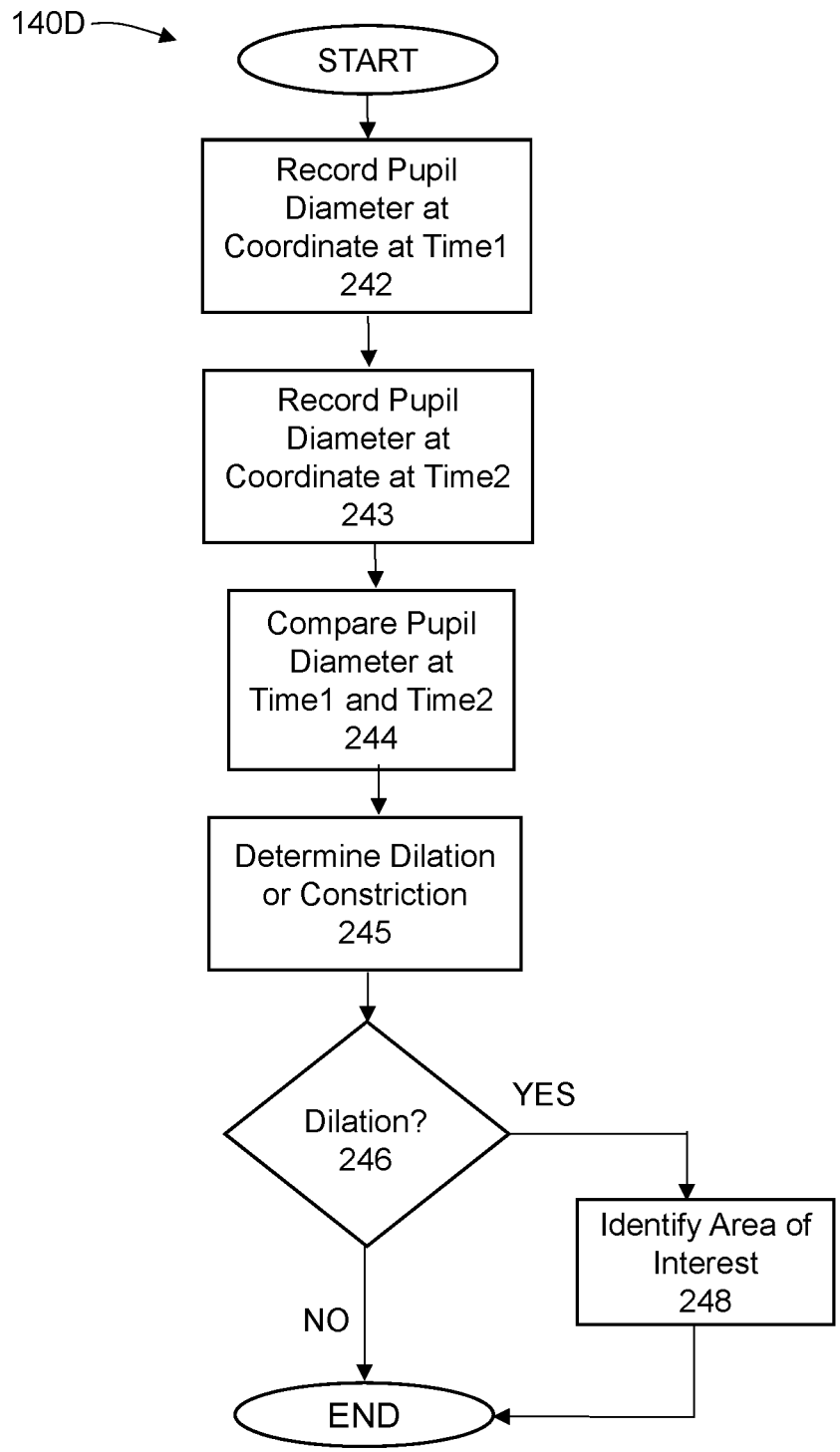
FIG. 7 illustrates a flow chart of the steps for analyzing eye movement data directed to pupil size according to the invention.

FIG. 7 illustrates a flow chart 140D of the steps for analyzing eye movement data directed to pupil size according to the invention. At step 242, pupil diameter of a user is recorded at a first time ("time1"). At step 243, pupil diameter of the user is recorded at a second time ("time2"). At step 244, the pupil diameters from steps 242, 243 are compared to determine whether the pupil dilated or constricted between the first and second times. In particular, if the diameter measured at step 242 is greater than the diameter measured at step 243, then the pupil constricted. Alternatively, if the diameter measured at step 242 is less than the diameter measured at step 243, the pupil dilated. If a dilation is determined at step 246, an area of interest is identified at step 248. Dilation may be defined as a change in pupil diameter greater than 3 mm, but any diameter value is contemplated. For example, the diameter value may be calculated from the user's data collected during previous viewing sessions or from data of multiple users. More specifically, the diameter value is dynamic and may be calculated based on the user's own viewing patterns such as average dilation for a particular subject, or based on deep machine learning (FIG. 8) of typical dilations that occur including dilation values for the same or similar subject being viewed or previously viewed.

Figure 8:
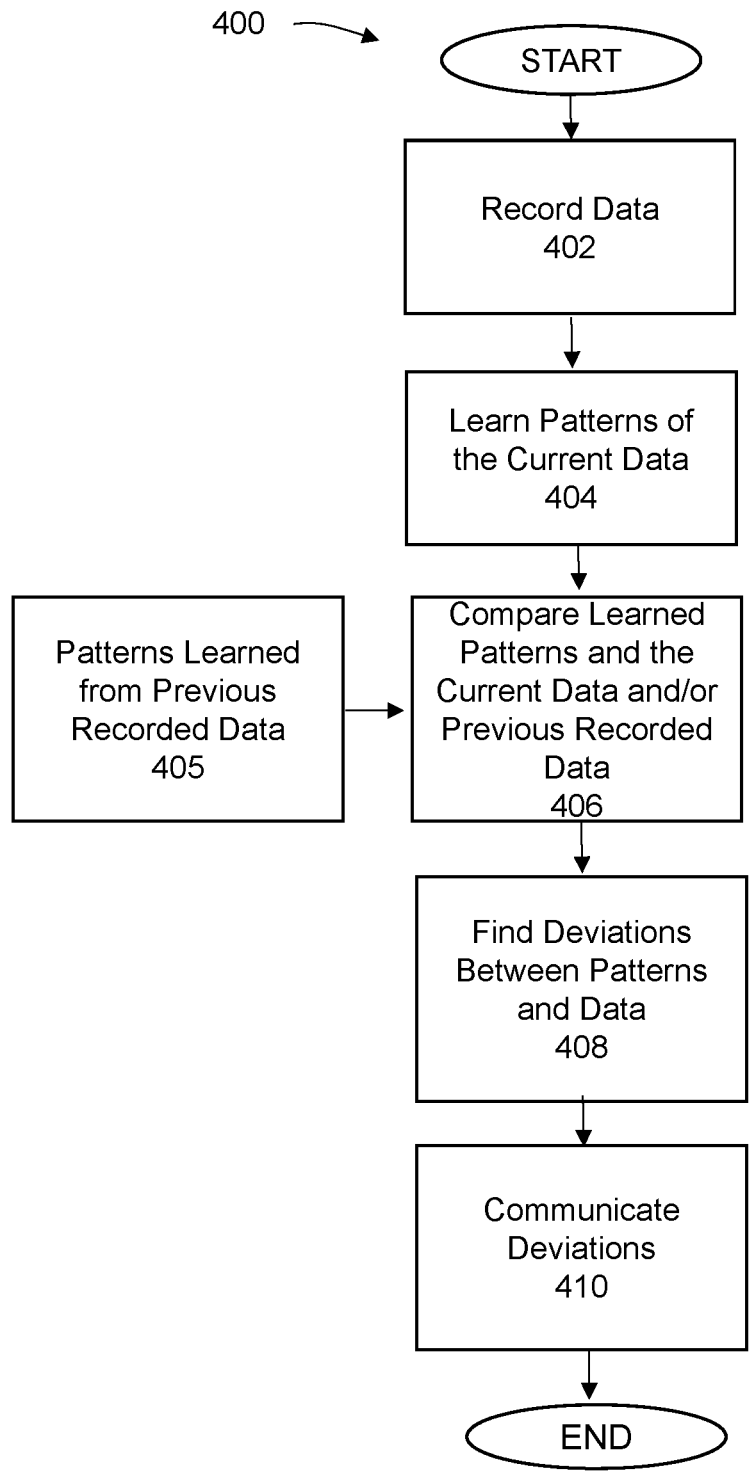
FIG. 8 illustrates a flow chart of the steps for deep machine learning according to the invention.

Deep machine learning systems or artificial intelligence systems can be used to assist the user in finding an area of interest in which an abnormality may be present. FIG. 8 illustrates a flow chart 400 for deep machine learning according to the invention. At step 402, eye movement data and/or physiological data is recorded. This data is then used to learn patterns of the data at step 404. The patterns may be learned for each user or groups of users indicating how that user views images and how the data changes when an abnormality is detected, either consciously or unconsciously. At step 406, patterns learned from step 404 are compared to the data recorded at step 402. Additionally, patterns learned from step 404 may be compared to patterns learned from data previously recorded as shown by step 405. Upon comparing learned patterns and data at step 406, data of a user viewing a subject that deviates from the learned patterns is found at step 408. At step 410, the deviations may be communicated to the user to assist in locating areas of interest. Returning to FIG. 1, after the eye movement data and/or physiological characteristic data is analyzed 140 any areas of interest are communicated in either visual, audible, or tactile form, at step 160. According to one embodiment of an information product, or visual feedback, provides content in the form of metrics such as numerically, through words, and/or through some other symbol prompting a user to re-view the subject again and, for example, determine whether the conclusions that were initially drawn are accurate or providing a detail or details that is or was observable in the scene or image of which the user may not be consciously aware.

The system may be configurable to permit a user to select the manner in which the feedback information is presented. For example, the feedback information may be presented as a dot—whose size may increase with the length of the duration of the fixation or increase with the number of returns to the same area. The feedback information may be presented also as a color which, in effect, highlights the area to which the user may wish to make one or more additional observations. The information may be presented also as a series of images, including as a movie, in order to inform the user how he or she was viewing the images and at what they were looking. These movies could be used as a direct evaluation tool to ensure that individuals are accurately and appropriately viewing subjects. This training tool may provide direct evaluation not just of performance in detecting specific features, but also opportunities to learn and apply more sophisticated viewing strategies. For example, a radiologist may determine that when viewing images of lungs, start with the upper left view images, then do lower left viewing all images, and then upper right and finish with lower right. Additionally, these movies maybe used to ensure that viewing of all images was performed by the health care professional.

Figure 9:
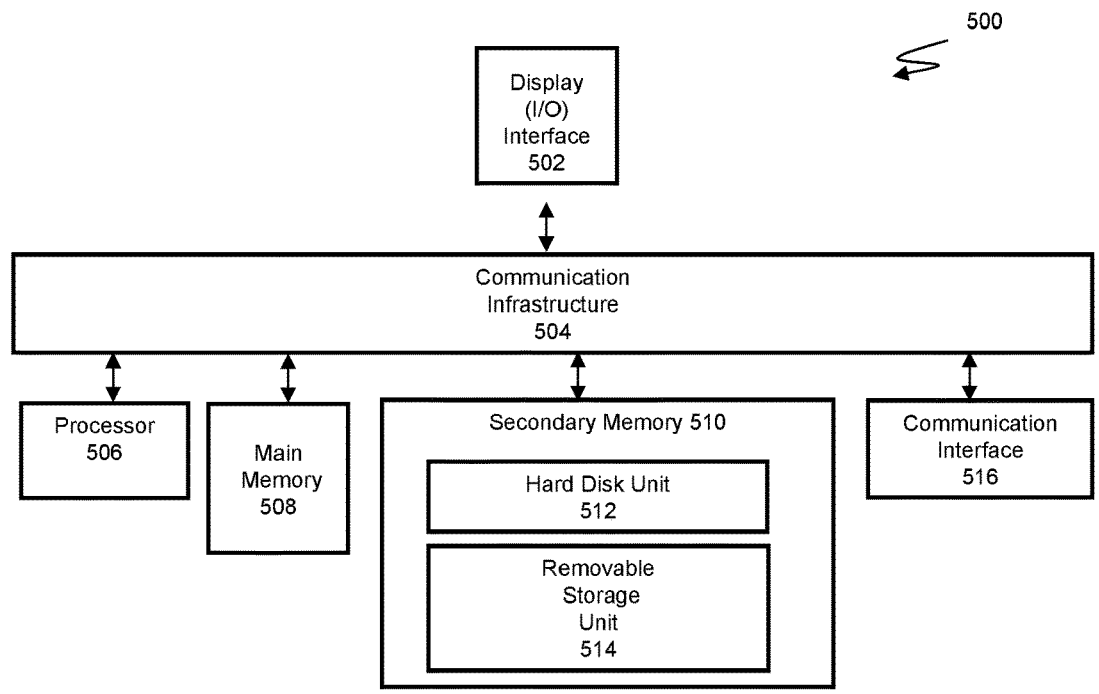
FIG. 9 is an exemplary computing system that may be used for implementation of all or a portion of the invention.

FIG. 9 illustrates an exemplary computer system 500 that may be used to implement the methods according to the invention. One or more computer systems 500 may carry out the invention according to processing instructions, or computer code.

Computer system 500 includes an input/output display interface 202 connected to communication infrastructure 504—such as a bus—which forwards data such as graphics, text, and information, from the communication infrastructure 504 to other components of the computer system 500. The input/output display interface 502 may be the display device 80 (FIG. 1) or, alternatively, a speaker, printer, any other computer peripheral device, or any combination thereof, capable of communicating an area of interest. Furthermore, the interface 502 may be a keyboard, joystick, trackball, mouse for the user to enter what he or she believes to be an area of interest.

One or more processors components 506 such as processor component 70 (FIG. 1) may be a special purpose or a general-purpose digital signal processor that processes certain information. Computer system 500 may also include a main memory 508, for example random access memory ("RAM"), read-only memory ("ROM"), mass storage device, or any combination of tangible, non-transitory memory as well as a secondary memory 510 such as a hard disk unit 512, a removable storage unit 514, or any combination of tangible, non-transitory memory.

Computer system 500 may also include a communication interface 516, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc. Communication interface 516 allows software, instructions and data to be transferred between the computer system 500 and external devices or external networks.

Computer programs, when executed, enable the computer system 500, particularly the processor 506, to implement the methods of the invention according to computer software instructions. The computer system 500 of FIG. 9 is provided only for purposes of illustration, such that the invention is not limited to this specific embodiment. It is appreciated that a person skilled in the relevant art knows how to program and implement the invention using any computer system.

The computer system 500 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 10:
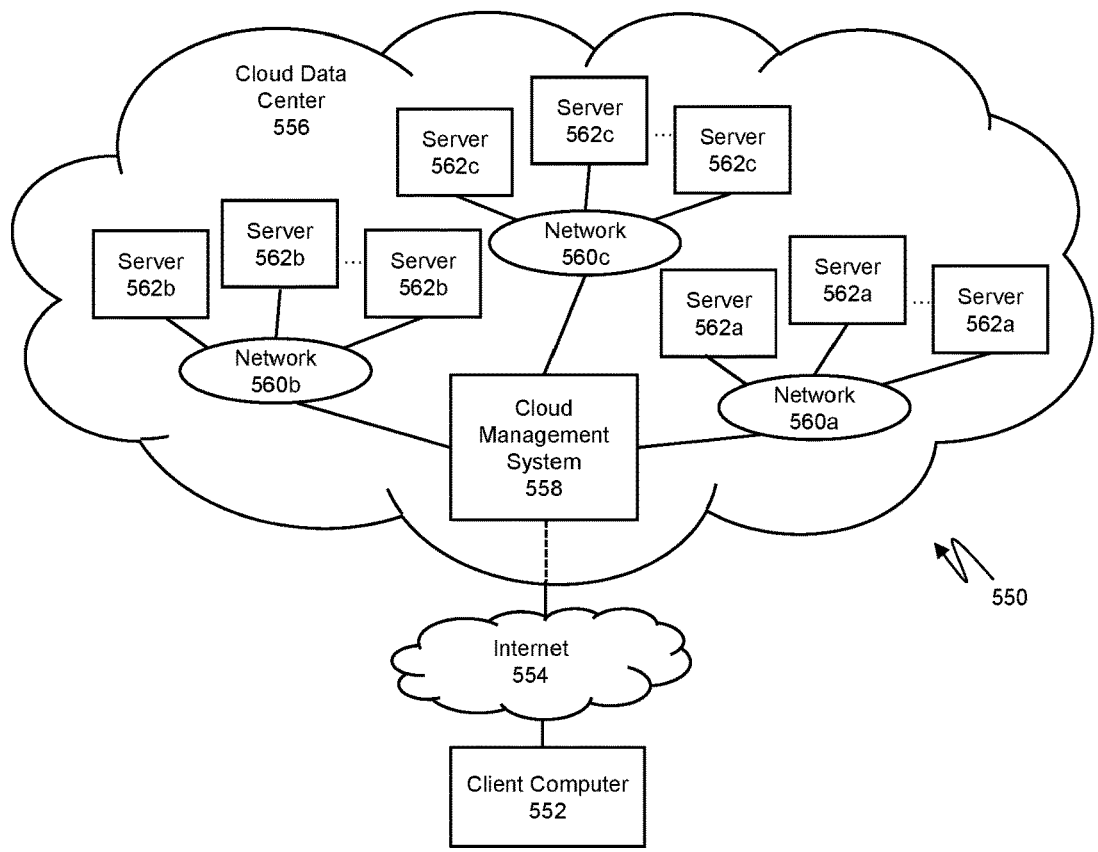
FIG. 10 is an exemplary cloud computing system that may be used for implementation of all or a portion of the invention.

Separate and apart from, or in addition to, computer system 500, the methods according to the invention may be implemented using a cloud computing system. FIG. 10 illustrates an exemplary cloud computing system 550 that may be used to implement the methods according to the invention. The cloud computing system 550 includes a plurality of interconnected computing environments. The cloud computing system 550 utilizes the resources from various networks as a collective virtual computer, where the services and applications can run independently from a particular computer or server configuration making hardware less important.

Specifically, the cloud computing system 550 includes at least one client computer 552. The client computer 552 may be any device through the use of which a distributed computing environment may be accessed to perform the methods disclosed herein, for example, the computer described above in FIG. 9, a portable computer, mobile phone, personal digital assistant, tablet to name a few. Signals are transferred between the client computer 552 and external devices including networks such as the Internet 554 and cloud data center 556. Communication may be implemented using wireless or wired capability such as cable, fiber optics, a phone line, a cellular phone link, radio waves or other communication channels.

The client computer 552 establishes communication with the Internet 554—specifically to one or more servers—to, in turn, establish communication with one or more cloud data centers 556. A cloud data center 556 includes one or more networks 560a, 560b, 560c managed through a cloud management system 558. Each network 560a, 560b, 560c includes resource servers 562a, 562b, 562c, respectively. Servers 562a, 362b, 362c permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

The cloud management system 558 may be configured to query and identify the computing resources and components managed by the set of resource servers 562a, 562b, 562c needed and available for use in the cloud data center 556. Specifically, the cloud management system 558 may be configured to identify the hardware resources and components such as type and amount of processing power, type and amount of memory, type and amount of storage, type and amount of network bandwidth and the like, of the set of resource servers 562a, 562b, 562c needed and available for use in the cloud data center 556. Likewise, the cloud management system 558 can be configured to identify the software resources and components, such as type of Operating System ("OS"), application programs, and the like, of the set of resource servers 562a, 562b, 362c needed and available for use in the cloud data center 556.

The cloud computing system 550 of FIG. 10 is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A computer-implemented method for evaluating decisions made by a user directed to a subject, the method comprising:
    displaying a subject on a display device for observation;
    overlaying a grid coordinate map over the subject, wherein the grid coordinate map is not visible on the display device and wherein a configuration of the grid coordinate map is determined based on at least a subset of features of the subject displayed;
    recording characteristics of one or more eyes of the user making the observation to generate eye movement data, the eye movement data including a number of times the user looks at each particular area on the subject ("fixation number"), a time duration the user looks at a particular area on the subject ("fixation duration value"), and a number of times the user returns to look at a particular area on the subject ("fixation repeats");
    analyzing the eye movement data to identify one or more areas of interest on the subject related to a decision by the user to observe the one or more areas; and
    communicating the one or more areas of interest related to the decision.

2. The computer-implemented method according to claim 1, the method further comprising:
    registering an input entered by the user, wherein the input identifies the one or more areas of interest.

3. The computer-implemented method according to claim 1, wherein the eye movement data further includes a pupil dilation/constriction while the user looks at a particular area on the subject ("pupil size").

4. The computer-implemented method according to claim 1, the method further comprising:
    collecting a total number of points of gaze at each coordinate on the grid coordinate map to provide the fixation number;
    determining if the fixation number exceeds a threshold number; and
    identifying the one or more areas of interest when the fixation number exceeds the threshold number.

5. The computer-implemented method according to claim 1, the method further comprising:
    measuring a duration of time of each point of gaze at each coordinate on the grid coordinate map to provide the fixation duration value;
    determining if the fixation duration value exceeds a threshold value; and
    identifying the one or more areas of interest when the fixation duration value exceeds the threshold value.

6. The computer-implemented method according to claim 1, the method further comprising:
    registering a point of gaze at a coordinate on the grid coordinate map;
    registering the absence of the point of gaze at the coordinate on the grid coordinate map;
    registering again the point of gaze at the coordinate on the grid coordinate map to provide a fixation repeat count;
    summing the fixation repeat counts to provide a fixation repeat number;
    determining if the fixation repeat number exceeds a threshold number; and
    identifying the one or more areas of interest when the fixation repeat number exceeds the threshold number.

7. The computer-implemented method according to claim 1, the method further comprising:
    recording a first pupil diameter at a coordinate on the grid coordinate map at a first time;
    recording a second pupil diameter at a coordinate on the grid coordinate map at a second time;
    comparing the first pupil diameter and the second pupil diameter;
    determining a dilation when the first pupil diameter is less than the second pupil diameter or a constriction when the first pupil diameter is greater than the second pupil diameter; and identifying the one or more areas of interest when the dilation is determined.

8. The computer-implemented method according to claim 1, wherein the communicating includes:
displaying metrics on the display device.

9. The computer-implemented method according to claim 1, wherein the recording includes:
learning patterns of the eye movement data;
finding deviations between the patterns and other eye movement data; and
communicating the deviations found.

10. The computer-implemented method according to claim 1, further comprising determining the configuration and wherein the determining is based on whether the subject is a two-dimensional image or three-dimensional scene.

11. The computer-implemented method according to claim 10, wherein the determining includes determining a spacing between two parallel vertical bars or between two parallel horizontal bars of the grid coordinate map based on the two-dimensional image or three-dimensional scene.

12. The computer-implemented method according to claim 1, wherein the subset of features includes a level of illustration detail of the subject or a range of colors of the subject.

13. The computer-implemented method according to claim 1, wherein the configuration includes concentric circles spaced apart, randomly.

14. A computer-implemented method for evaluating decisions made by a user directed to a subject, the method comprising:
displaying an image of the subject on a display device for observation;
overlaying a grid coordinate map over the image, wherein the grid coordinate map is not visible on the display device, wherein the grid coordinate map includes a plurality of coordinates not visible on the display device, and wherein a configuration of the grid coordinate map is determined based on at least a subset of features of the subject;
recording movement of one or more eyes of the user making the observation to generate eye movement data, wherein the eye movement data includes a number of times the user looks at each coordinate overlaid on the image ("fixation number"), a time duration the user looks at each coordinate overlaid on the image ("fixation duration value"), a number of times the user returns to look at each coordinate overlaid on the image ("fixation repeats"), and a pupil dilation/constriction while the user looks at each coordinate overlaid on the image ("pupil size");
analyzing the eye movement data to identify one or more areas of interest on the subject related to a decision by the user to observe the one or more areas, wherein the one or more areas of interest are identified according to one or more of the following: the fixation number exceeds a first threshold number, the fixation duration value exceeds a threshold value, the fixation repeat number exceeds a second threshold number, and a dilation determined from the pupil size; and
communicating the one or more areas of interest related to the decision.

15. A system for evaluating decisions made by a user directed to a subject, the system comprising:
a display device configured to display an image of a subject for observation;
an eye tracking apparatus configured to obtain eye movement data of the user observing the image of the subject; and
a processor component instructed to:
overlay a grid coordinate map over the image of the subject, and wherein a configuration of the grid coordinate map is determined based on at least a subset of features of the subject;
record movement of one or more eyes of the user observing the image of the subject to generate eye movement data, the eye movement data including a number of times the user looks at each particular area on the subject ("fixation number"), a time duration the user looks at a particular area on the subject ("fixation duration value"), and a number of times the user returns to look at a particular area on the subject ("fixation repeats");
analyze the eye movement data to identify one or more areas of interest on the subject related to a decision by the user to observe the one or more areas; and
communicate on the display device the one or more areas of interest related to the decision.

16. The system according to claim 15, wherein the eye movement data further includes a pupil dilation/constriction while the user looks at each coordinate overlaid on the image ("pupil size").

17. The system according to claim 15, wherein the grid coordinate map is not visible on the display device.

18. The system according to claim 15, wherein the grid coordinate map is a mesh pattern of parallel vertical bars and parallel horizontal bars defining a plurality of predefined x, y, or x, y, z coordinates on the grid coordinate map.

19. The system according to claim 15, wherein the subject is a three-dimensional scene.

20. The system according to claim 15, wherein the subject is a two-dimensional image.

21. The system according to claim 15, wherein the processor component is further instructed to perform at least one of:
collecting a total number of points of gaze at each coordinate on the grid coordinate map to provide the fixation number;
determining if the fixation number exceeds a threshold number; and
identifying the one or more areas of interest when the fixation number exceeds the threshold number.

22. The system according to claim 15, wherein the processor component is further instructed to perform at least one of:
measuring a duration of time of each point of gaze at each coordinate on the grid coordinate map to provide the fixation duration value;
determining if the fixation duration value exceeds a threshold value; and
identifying the one or more areas of interest when the fixation duration value exceeds the threshold value.

23. The system according to claim 15, wherein the processor component is further instructed to perform at least one of:
registering a point of gaze at a coordinate on the grid coordinate map;
registering the absence of the point of gaze at the coordinate on the grid coordinate map;
registering again the point of gaze at the coordinate on the grid coordinate map to provide a fixation repeat count;
summing the fixation repeat counts to provide a fixation repeat number;

determining if the fixation repeat number exceeds a threshold number; and identifying the one or more areas of interest when the fixation repeat number exceeds the threshold number.

24. The system according to claim 15, wherein the processor component is further instructed to perform at least one of:

recording a first pupil diameter at a coordinate on the grid coordinate map at a first time;

recording a second pupil diameter at a coordinate on the grid coordinate map at a second time;

comparing the first pupil diameter and the second pupil diameter;

determining a dilation when the first pupil diameter is less than the second pupil diameter or a constriction when the first pupil diameter is greater than the second pupil diameter; and identifying the one or more areas of interest when the dilation is determined.

* * * * *